Sept. 12, 1967 W. L. CHAMBERS ET AL 3,341,181
EJECTOR MECHANISM FOR MIXER
Original Filed March 27, 1964 3 Sheets-Sheet 1
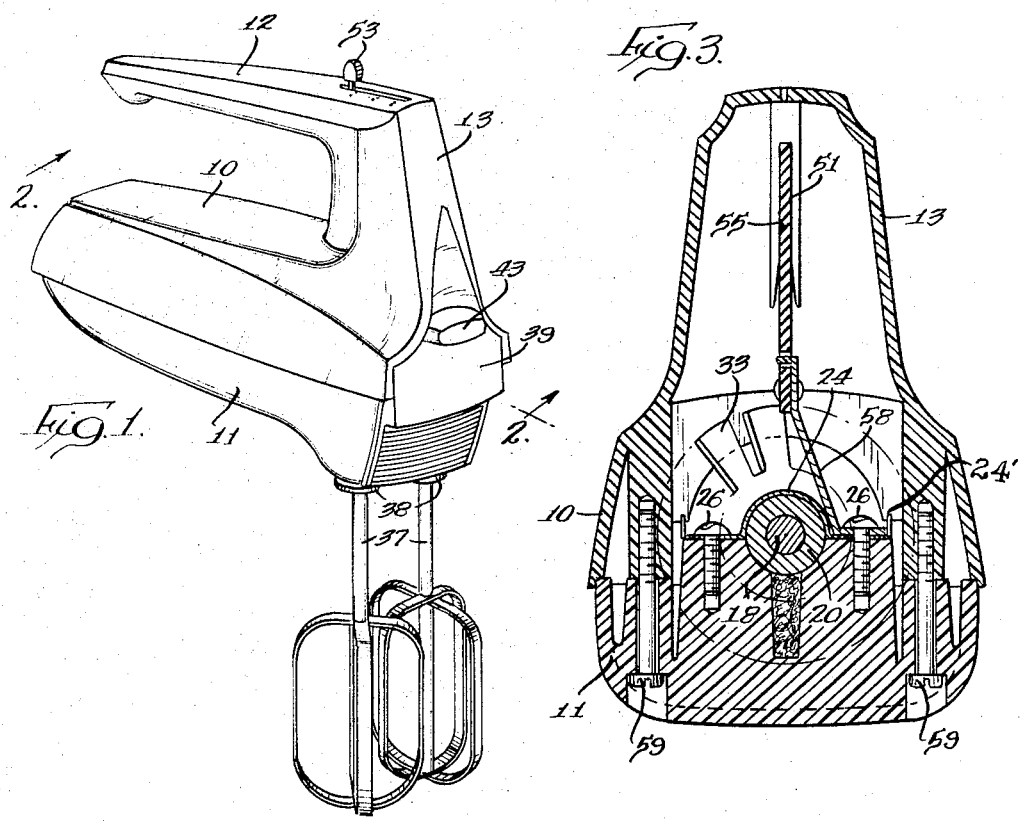
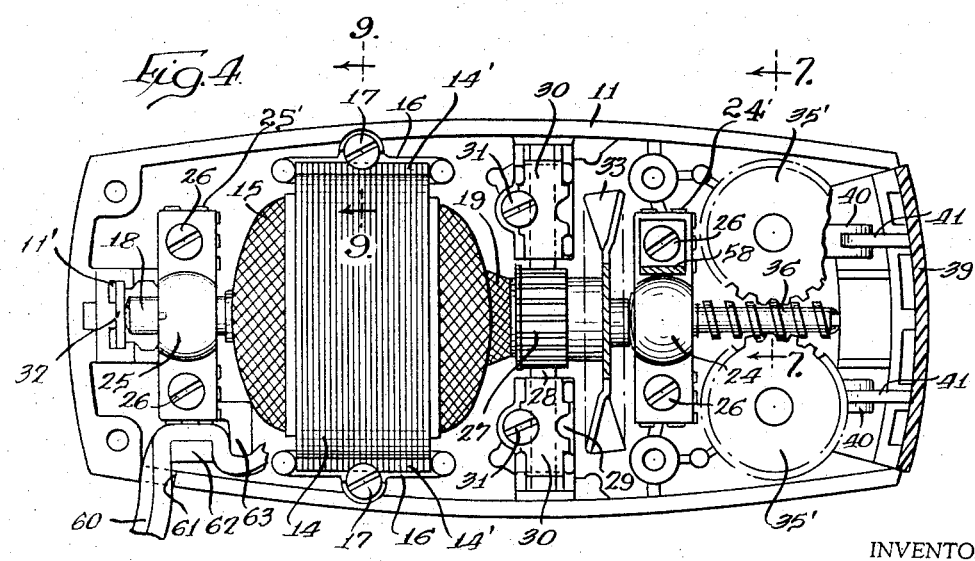
INVENTORS:
Worthy L. Chambers
James A. Wright
By George R. Clark Atty Sept. 12, 1967 W. L. CHAMBERS ETAL 3,341,181
EJECTOR MECHANISM FOR MIXER
Original Filed March 27, 1964 3 Sheets-Sheet 2
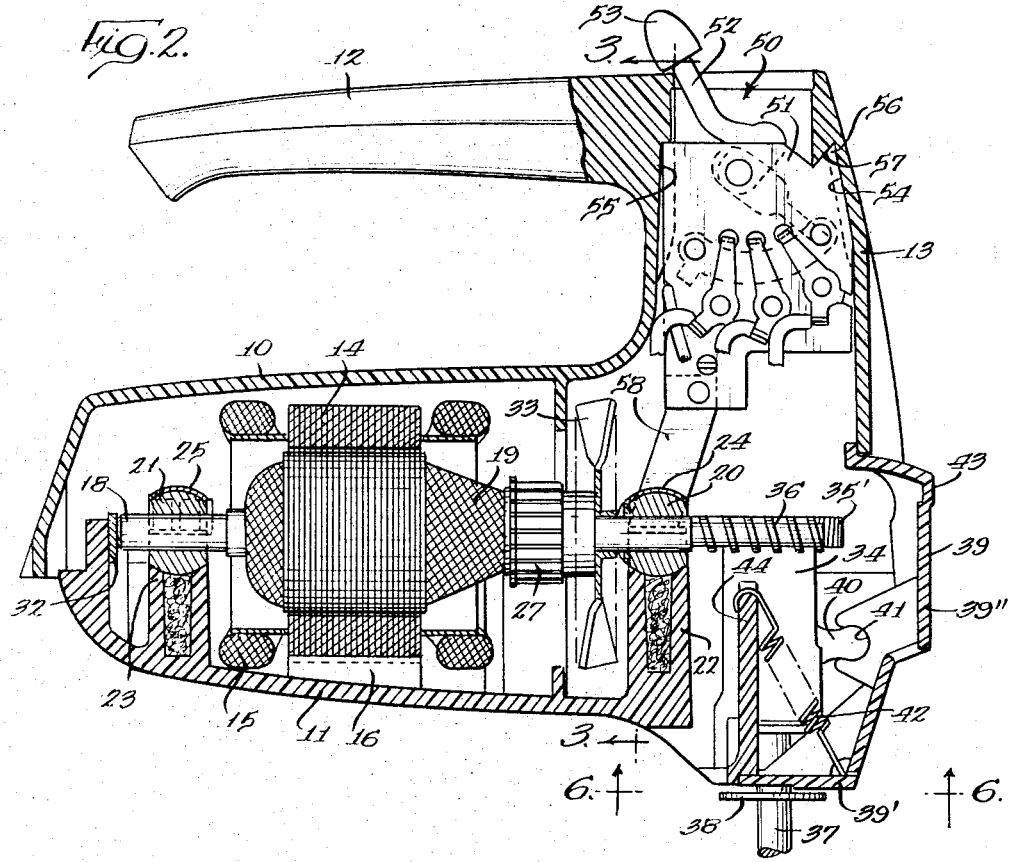
INVENTORS:
Worthy L. Chambers
James A. Wright
By
George R. Clark
Atty

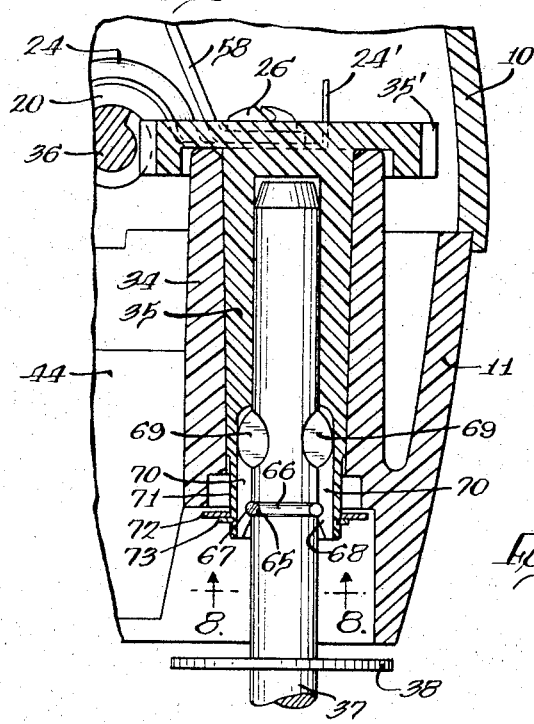
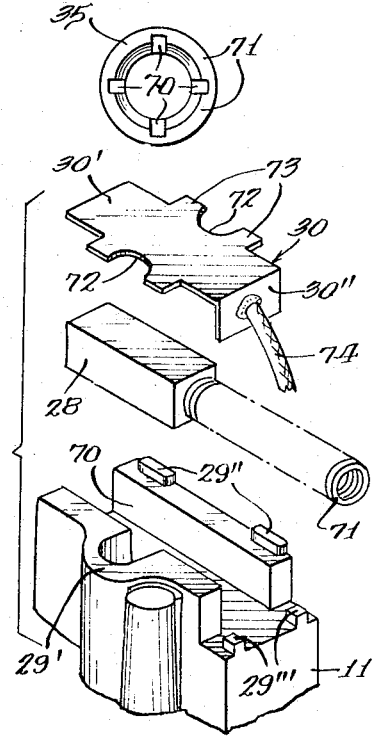
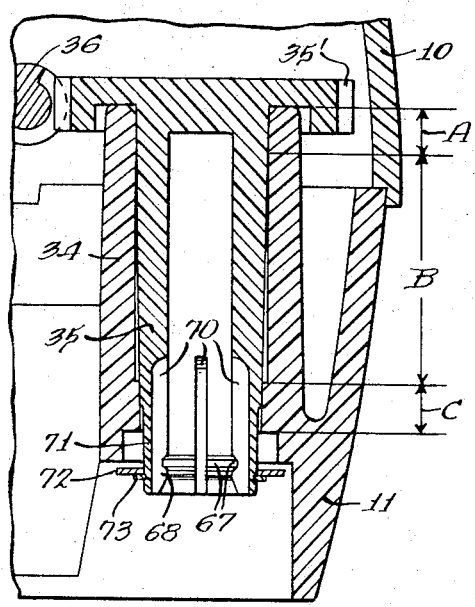
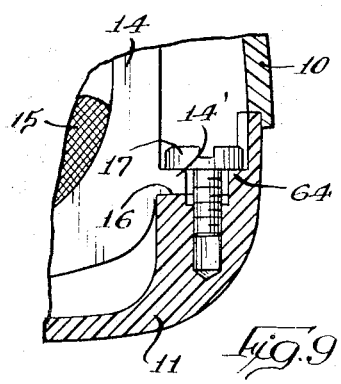

United States Patent Office 3,341,181
Patented Sept. 12, 1967

3,341,181
EJECTOR MECHANISM FOR MIXER
Worthy L. Chambers, Wilmette, and James A. Wright, Chicago, Ill., assignors to Sunbeam Corporation, Chicago, Ill., a corporation of Illinois
Original application Mar. 27, 1964, Ser. No. 355,171, now Patent No. 3,271,013, dated Sept. 6, 1966. Divided and this application Mar. 3, 1966, Ser. No. 531,388
2 Claims. (Cl. 259—1)

ABSTRACT OF THE DISCLOSURE

The open front end of the mixer base is closed by an L-shaped beater ejection lever which is pivoted to the mixer base. The base portion of the L-shaped beater ejection lever extends beneath the mixer base to above a pair of shoulders on the mixer beater shafts. When the L-shaped lever is pivoted towards the mixer its base portion bears down on the mixer beater shaft shoulders to disengage the mixer beater shafts from the mixer.

---

This invention relates to improvements in mixers, and more particularly, to an improved low cost mixer. This application is a division of patent application Ser. No. 355,171, filed Mar. 27, 1964, and now Patent No. 3,271,013.

It is an object of this invention to provide a low cost, readily assembled, and improved mixer.

Heretofore, it has been common to mount the mixer parts such as the motor, its bearings, the commutator brushes, their insulation, and the drive mechanism for the beaters on a metal base member such as a die casting. This die cast base member had to be machined or finished to proper dimensions to accurately mount the mixer parts. The base member and assembled mixer was enclosed in an outer casing or housing. The outer housing commonly comprised two complementary molded plastic members which together defined an enclosure for the mixer and its base member. These two plastic members commonly comprised a bottom member and a top member having a handle integrally formed thereon or otherwise connected thereto.

The requirement of a die cast base member and its machining or finishing obviously added to the cost of the mixer. This was true even if the bottom plastic member was omitted. That is to say, high costs were the result even if the die cast base member also served as a bottom closure member. Metal base members, for one thing, were thought to be necessary to obtain adequate cooling of the motors. Stated another way, it was believed to be impractical to use molded plastic for the base member, because of the problems of rapidly dissipating the heat generated by the moving mixer parts or overheating of the plastic.

Briefly, in the invention a single molded plastic part, such as phenolic, is used as a base member and bottom closure member for the mixer. Using molded plastic makes it possible to readily form the necessary supports or recesses for the mixer parts without further operations such as machining. Using molded plastic also makes it possible to eliminate certain electrical insulating parts which were heretofore required with metallic die cast base members. The beater spindle bearings are integrally formed in the molded plastic mixer base. The beater spindles and their gears are also integrally formed with each other from molded plastic such as nylon. The seats for the bearings and the holders for the commutator brushes are integrally formed in the plastic base member. All these illustrative parts can be accurately formed by known molding processes making special inserts or the like unnecessary. These several advantages are made possible by ensuring adequate cooling of the moving mixer parts. For example, the bearing retains are fabricated from high heat conductive material, such as copper alloy, and they are provided with integral heat dissipating cooling fins. The cooling fan is constructed from aluminum, for example, for a similar purpose. The bracket for supporting the mixer switch is likewise constructed from aluminum and is mounted on the front bearing retainer. The cumulative effect of these steps is to insure adequate cooling so that the plastic base member is not overheated. For example, the aluminum fan, cooling fins on the front bearing, and the aluminum strap for the switch insure proper cooling of the front end of the mixer. The front end of the mixer contains the commutator and the brushes and the beater spindle drive mechanism which is an area of high heat generation due to the friction of these moving parts.

Additionally, in the invention a single piece beater ejector is provided. The beater ejector comprises a generally L-shaped member which closes the front end and front bottom portion of a mixer housing which is open in front and below the bearings for the beater shafts. The beater shafts have shoulders formed thereon below the bearings. The base of the L-shaped member acts downwardly on the shoulders to eject the shafts and it also closes the open front bottom portion of the housing. The other part of the L-shaped member closes the front end of the housing and is pivotally connected to the housing in an uncomplicated manner by integral bearing means formed on the housing and L-shaped member and a spring.

The switch of the mixer is mounted in the hollow post of the mixer handle by inserting it through the bottom of the post. The switch comprises a terminal board and two of its opposite edges are received in a pair of grooves formed in opposite sides of the hollow post. The upper end of the board has a projection formed thereon along one of the mentioned edges. The end of the groove corresponding to this edge terminates in a notch adapted to receive the projection.

The invention will be better understood by considering the following description taken in connection with the accompanying drawings.

In the drawings, FIG. 1 is a perspective view of a mixer embodying the invention;

FIG. 2 is an enlarged sectional view taken along the section line 2—2 of FIG. 1;

FIG. 3 is a sectional view taken along the section line 3—3 of FIG. 2;

FIG. 4 is a top plan view of the mixer with the upper portion of the housing removed;

FIG. 5 is a broken away sectional view similar to that of FIG. 2 showing the beater ejection mechanism in ejecting position;

FIG. 6 is a broken away section view taken along the section line 6—6 of FIG. 2;

FIG. 7 is an enlarged sectional view taken along the section line 7—7 of FIG. 4;

FIG. 8 is a sectional view taken along the section line 8—8 of FIG. 7;

FIG. 9 is an enlarged sectional view taken along the section line 9—9 of FIG. 4;

FIG. 10 is a sectional view similar to that of FIG. 7 showing a modification of the spindle bearing; and FIG. 11 is an exploded perspective view of the improved brush assembly.

Referring now to the drawings, a hand type mixer is illustrated and its comprises a housing or casing having top and bottom or base members 10 and 11 respectively. Members 10 and 11 are recessed and elongated. A handle or hand grip 12 is connected to the mixer by a hollow post 13. Post 13 may be integral with handle 12 and top member 10. The working parts of the mixer are assembled in the bottom member 11, and the top member 10 comprises a cover for the bottom member 11 and its supported parts. Both members 10 and 11 are fabricated from molded plastic.

The mixer comprises a motor having a stator core 14 and the stator windings 15. The stator core 14 is supported on integral ledges 16 of the base or bottom member 11 by positioning screws 17. The shaft 18 of the motor armature 19 is supported in front and rear bearings 20 and 21, respectively, see FIG. 2. The bearings 20 and 21 are supported in integral bearing supports 22 and 23, respectively, of the base member 11. The bearings 20 and 21 are retained on the supports 22 and 23 by bearing retainers 24 and 25 respectively. Bearing retainers 24 and 25 are held in place by screws or the like 26 and are provided with integral cooling fins 24' and 25' respectively.

The armature 19 is provided with a commutator 27 and commutator brushes 28. Brushes 28 are guided in recessed brush holders 29 which are formed integral with base 11. The brushes 28 are retained captive in the brush holders 29 by brush retainers 30 and screws or the like 31. The brush retainers 30 are shaped the same and are reversible left for right. An end thrust bearing 32 is provided for the rear of shaft 18, and a fan blade 33 mounted on shaft 18 pulls a cooling draft through the housing. Suitable cooling air vents are provided in the housing in a manner well known to those skilled in the art. The fan 33 is preferably constructed from aluminum to dissipate heat, and the bearing retainers 24 and 25 from copper alloy.

The end thrust bearing pad 32 is held captive in an integral recessed portion 11' of the base 11, see FIG. 4. An electric extension cord 60 enters the housing through an aperture 61 formed in the rear portion of base 11. A strain relief for cord 60 is integrally formed on base 11. The strain relief comprises a pair of spaced lugs 62 and 63 integral with base 11 adjacent aperture 61. The cord 60 after passing through aperture 61 is curved first around lug 62. Then it extends between lugs 62 and 63 and curves around lug 63. This snaking or curving of cord 60 around and between the lugs 62 and 63 relieves the stress on the inner connection, not illustrated, of the cord 60 to the motor.

Referring to FIG. 9, the screws 17 mount the stator 14 by clamping its integral shoulders 14' to the ledges 16 of base 11. Outboard of the ledges 16 the base 11 has integral shoulders 64 beneath the heads of the screws 17. Shoulders 64 prevent the screws 17 from cocking in an outboard direction when they are tightened. As screws 17 are finally tightened they will engage the shoulders 64. In the absence of shoulders 64 tightening of screws 17 would result in their tilting or cocking away from the stator, and this movement would develop cracks or weaknesses in the plastic base at the area of the screws.

The plastic of base 11 gives double insulation characteristics to the mixer. For example, if a fault should develop in the insulation of stator windings 15, since base 11 is constructed from plastic there would not be a short circuit through the base, which would be the case if base 11 were a metallic die casting. The plastic base 11 also makes it possible to economize on insulation inserts required with die cast bases. For example, if the brush holders or guides 29 were integrally formed in a metallic die casting then insulating sleeves would be required for the brushes 28.

Ahead of the front motor bearing support 22, a pair of spindle bearings 34 are formed integral with base 11. Bearings 34 are hollow and have their axes disposed perpendicular to the lengthwise axis of base 11. The bearings 34 have hollow beater shaft receiving spindles 35 inserted therein, see FIG. 7. Pinion gears 35' are integrally formed at the upper end of the hollow spindles 35, and these gears 35' are driven by a pinion worm 36 formed at the forward end of shaft 18. The integral spindles 35 and gears 35' are constructed from plastic such as graphite impregnated or molybdenum disulphide compounded nylon. The nylon spindles 35 ride directly on the phenolic of bearings 34 and the graphite or molybdenum disulphide serves as a lubricant making an enclosed gear chamber and grease unnecessary.

A pair of beater shafts 37 are received in the bearings 34 and removably locked in their hollow spindles 35 for manual ejection in a manner to be described. The bearings 34 and spindles 35 have a slight draft angle or taper to facilitate their fabrication by molding and subsequent assembly without holding close manufacturing tolerances. That is to say, the inner bearing surface of bearing 34 and the outer bearing surface of spindle 35 have a slight cone-shape. Also, the bearing 34 is slightly larger than the spindle 35. Therefore, when spindle 35 is inserted into bearing 34, the upper end of bearing 34 will engage the underside of gear 35'. Therefore, bearing support is provided for the spindle proper as well as its integral gear. This is illustrated in FIG. 7. The modification shown in FIG. 10 is the same except that distinct upper and lower bearing surfaces or lands are formed at the A and C areas of the bearing 34. In this form of the invention the distinct upper and lower bearings are formed at the same taper, but the area B is relieved by having a larger taper or draft angle. This arrangement will find advantage in the case of long spindles, such as those required in more powerful stand-type mixers. Otherwise, the FIGS. 7 and 10 forms of the invention are the same. Distinct A and C bearing lands and the intervening relief B are useful in large stand type mixers since with long molded spindles it may be difficult to compensate for surface molding irregularities.

The shafts 37 are axially retained in the spindles 35 by a split one turn locking spring 65. Spring 65 is loosely carried by shaft 37 in a groove 66. When shaft 37 is inserted into spindle 35 spring 65 is first compressed into groove 66 and then free to expand into a groove 67 when grooves 66 and 67 are aligned. The groove 67 is formed on the lower end of the spindle 35. The annular ridge 68 just below groove 67 is the part of spindle 35 which compresses the ring 65 into groove 66 when inserting or removing the shaft 37.

The drive connection between the shaft 37 and spindle 35 comprises axial keys 69 on the shaft 37 which enter axial key receiving grooves 70 formed on the inside of the hollow spindle. The grooves 70 are not through slots. If they were, this would be an area of weakness in the spindle 35. Since the grooves 70 are not through slots the grooves 70 in effect are interconnected by integral web portions 71 of the lower end of the spindle. To look at it another way, if grooves 70 were through slots the webs 71 would in effect be spaced drive fingers for receiving the keys 69. Such spaced drive fingers, when constructed from plastic, might fracture or become mutilated. Therefore, an outer reinforcing ring, such as of metal, would have to be used for the fingers. However, with the integral webs 71 no reinforcing ring is required to obtain a drive connection which is adequate to do the job and long lived.

The spindles 35 are retained in the bearings 34 by means such as bearing and lock washers 72 and 73 positioned on the lower end of spindles 35. The shafts 37 have shoulders 38 formed thereon beneath the bearings 34 for purposes of ejecting the shafts 37. The front end of base member 11 is open or cut away below and ahead of the bearings 34. This opening is closed by a one-piece beater ejector member 39. Member 39 is generally L-shaped with its base portion 39' normally disposed between bearings 34 and shoulders 38. The other portion 39" of L-shaped member 39 is positioned in front of bearings 34 and integral pivot bearing means 40 and 41 are formed on the bearings 34 and inside of portion 39". The pivot bearing portions 40 and 41 are retained engaged by a coil spring 42. The axis of coil spring 42 is disposed beneath pivot bearing means 40, 41 and spring 42 biases the beater ejector 39 to the non-ejecting position illustrated in FIG. 2. To eject the beaters, it is merely necessary to push its upper end or ejector button portion 43 inwardly as illustrated in FIG. 5. The base portion 39' has two notches 43' which are aligned with the spindles 35 through which the shafts 37 can be inserted into the spindles 35. The coil spring 42 extends from the inside of L-shaped member 39 to the upper part of a wall 44 integral with base 11. Wall 44 extends between bearings 34 and is also integral therewith.

The speed of the mixer is controlled by a switch indicated generally by reference numeral 50. Switch 50 comprises a terminal switch board 51 which is inserted into the hollow post 13 through the bottom thereof. The switch includes an operating lever 52 protruding through the top of post 13. The upper end of lever 52 has a thumb knob 53. The front and rear edges of the board 51 are received in front and rear grooves 54 and 55 formed inside the hollow post 13. Formed on the top of board 51 along its front edge is projection 56 which is preferably wedge-shaped. This projection is received in an inverted V-shaped notch 57 formed at the upper end of groove 54. The board 51 is supported in the grooves 54, 55 and notch 57 from its lower end by a rigid support strap 58. At its upper end the strap 58 is connected to the board 51 and at its lower end strap 58 is mounted on the front bearing support 22 by one of the screws 26. Strap 58 is preferably constructed from aluminum for heat dissipating purposes.

The mixer is assembled as illustrated in the drawings on the base member 11. Thereafter the top part 10 is placed over member 11 to insert the board 51 in its grooves 54, 55 and notch 57. In this position of cover 10, lever 52 will protrude through the upper end of post 13. Thereafter, the assembly is completed as by screws 59 connecting members 10 and 11 together and the addition of knob 53 to lever 52.

The improved commutator brush assembly will now be described by reference to FIGS. 4 and 11. The brush holders 29 are integrally formed in the plastic base member 11 and seat the brushes 28 directly on the plastic base. The brush holders 29 have a channel or guideway 70 which is slightly oversize with respect to the cross section of the brushes so that they are free to slide toward the commutator 27 as they wear. Brushes 28 are biased inwardly by coil springs 71 disposed behind the brushes. The brush retainers 30 are L-shaped and are superposed on the brush holders to close the open upper sides of channels 70. The horizontal leg 30' of the retainers extend lengthwise of channel 70 whereas the vertical leg 30" closes the outer open ends of the channel 70. One side of the brush holders 29 have an integral boss 29' for receiving the screw 31. The other side has integral spaced positioning projections or lugs 29". A notch 72 is formed on opposite sides of the legs 30'. These notches pass the screws 31. Each notch 72 is bounded by a pair of tabs 73 which fit between the positioning lugs 29". A pair of lugs 29" are also formed at the outer end of brush holders 29 along opposite sides of the channel 70. These lugs engage the bottom edge of the lug 30". The coil springs 71 are trapped inside the channel 70 between the brushes 28 and legs 30". A lead 74 is soldered to the legs 30" and current flows from the brush to the lead through the retainers 30 and springs 71. With this construction the brushes are easy to replace, the assembly is low cost, and no special inserts are required. For example, the base 11 itself provides the necessary insulation for the brushes, thereby eliminating the prior art insulating sleeves or brush holders of prior mixers using die cast bases.

While there has been illustrated and described an embodiment of the present invention, it will be appreciated that numerous changes and modifications will occur to those skilled in the art, and it is intended in the appended claims to cover all those changes and modifications as fall within the true spirit and scope of the present invention.

What is claimed as new and desired to be secured by Letters Patent of the United States is:

1. In a hand mixer, a casing comprising an elongated recessed lower housing member, a pair of hollow bearings integrally formed on said housing member adjacent the front end thereof, said bearings being disposed perpendicular to the lengthwise axis of said housing member, said front end and the bottom portion of said housing member adjacent said front end being open to expose the front and bottom of said bearings, a pair of beater shafts positioned in said bearings, a shoulder formed on said shafts beneath said bearings, a one-piece member for ejecting said beater shafts and closing said open bottom portion and front end, said one piece member being generally L-shaped, the base portion of said L-shaped member being positioned in said open bottom portion between said bearings and shoulders, and the other portion of said L-shaped member being positioned ahead of said bearings, engageable pivot bearing means integrally formed on said housing member and said L-shaped member for pivotally mounting said L-shaped member on said housing member, and a spring interconnecting said housing member and L-shaped member, said spring retaining said pivot bearing means engaged and biasing said L-shaped member to non-ejecting position.

2. In a hand mixer as in claim 1, wherein said pivot bearing means are formed on said bearings and the inside of said other portion of said L-shaped member, a wall integral with said housing member extending between said bearings, and said spring comprising a coil spring, opposite ends of said coil spring being connected to said wall and the inside of said L-shaped member, and the axis of said coil spring being disposed beneath said pivot bearing means.

References Cited

UNITED STATES PATENTS

| | | | |
|---|---|---|---|
| 3,275,051 | 9/1966 | Jepson et al. | 259—131 X |
| 3,280,351 | 10/1966 | Wolter et al. | 259—131 X |

FOREIGN PATENTS

| | | |
|---|---|---|
| 602,050 | 7/1960 | Canada. |
| 1,261,027 | 4/1961 | France. |

WILLIAM I. PRICE, *Primary Examiner.*